(12) United States Patent
Ettritch et al.

(10) Patent No.: US 6,467,079 B1
(45) Date of Patent: Oct. 15, 2002

(54) REPORT PROGRAM LANGUAGE SOURCE CODE TRANSLATION TO OBJECT-ORIENTED LANGUAGE SOURCE CODE WHICH EMULATES REPORT PROGRAM LANGUAGE BEHAVIOR

(75) Inventors: Sarah J. Ettritch, Toronto; John F. Fellner, Markham, both of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/412,169

(22) Filed: Oct. 5, 1999

(30) Foreign Application Priority Data

Mar. 30, 1999 (CA) .............................................. 2267482

(51) Int. Cl.$^7$ ................................................ G06F 9/44
(52) U.S. Cl. ...................... 717/108; 717/137; 714/100
(58) Field of Search ................................ 717/2, 3, 7, 1, 717/100–123, 136–150; 709/300, 319, 328, 329; 714/100, 38

(56) References Cited

U.S. PATENT DOCUMENTS 5,768,564 A * 6/1998 Andrews et al. ............ 717/137
6,029,207 A * 2/2000 Heninger .................... 709/331
6,158,044 A * 12/2000 Tibbetts ...................... 717/100
6,305,009 B1 * 10/2001 Goor .......................... 717/116

OTHER PUBLICATIONS

Flanagan, Java in a Nutshell, Second Edition, Updated for Java 1.1, May 1997.*

* cited by examiner

*Primary Examiner*—Kakali Chaki
*Assistant Examiner*—Hoang-Vu Antony Nguyen-Ba
(74) *Attorney, Agent, or Firm*—Gregory M. Doudnikoff

(57) ABSTRACT

A computer-implemented method in which report program language is converted to object-oriented source code, such as Java, using the report program language compiler. The object-oriented source code emulates the behaviour of the report program language, such as VARPG. Applications written in RPG are converted to Java and therefore can run on every platform for which a Java virtual machine exists. RPG programmers now have the ability to write internet applications. Java applications and applets can be written in RPG and existing RPG applications can be converted to Java applets.

14 Claims, 3 Drawing Sheets

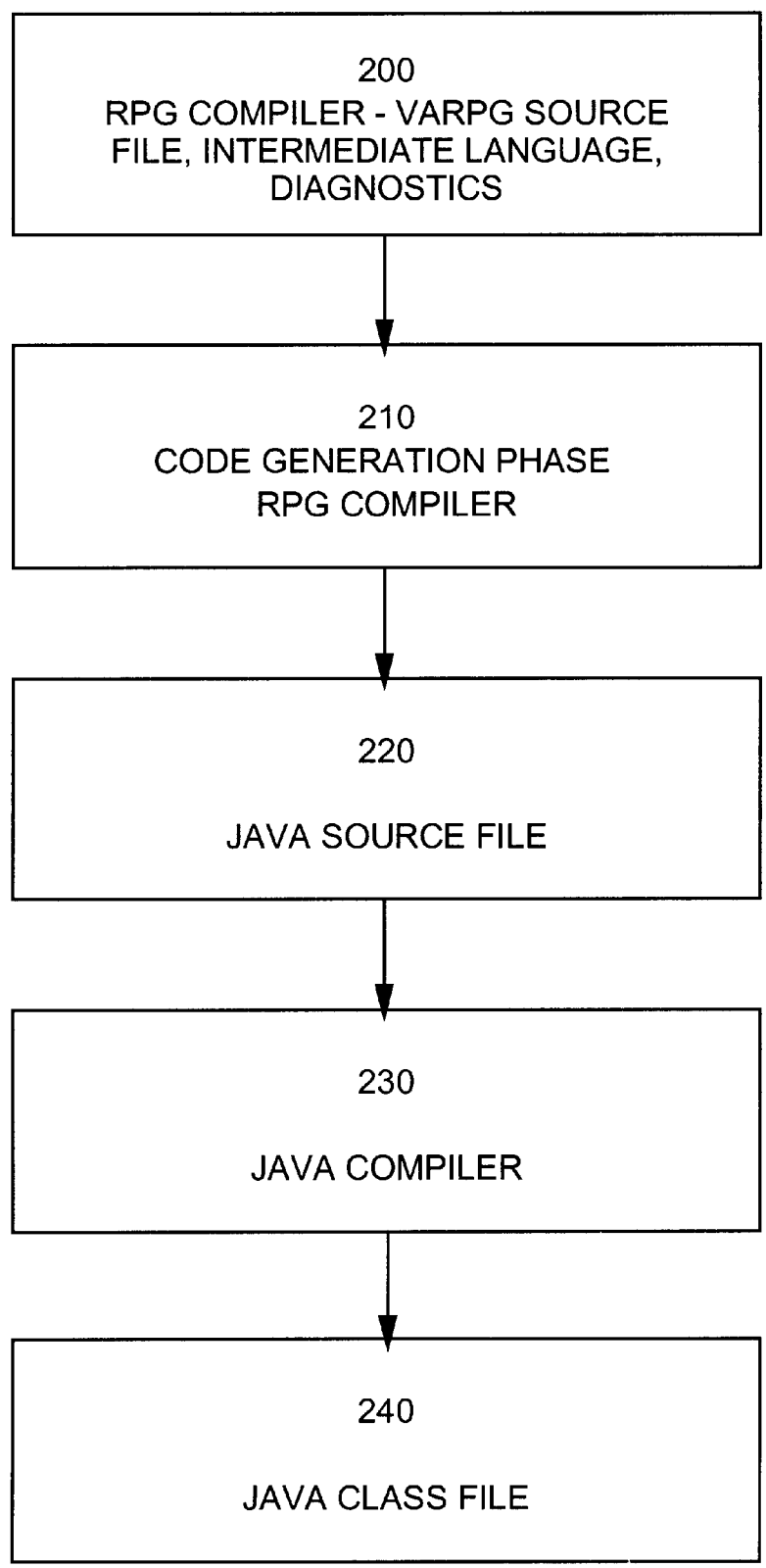

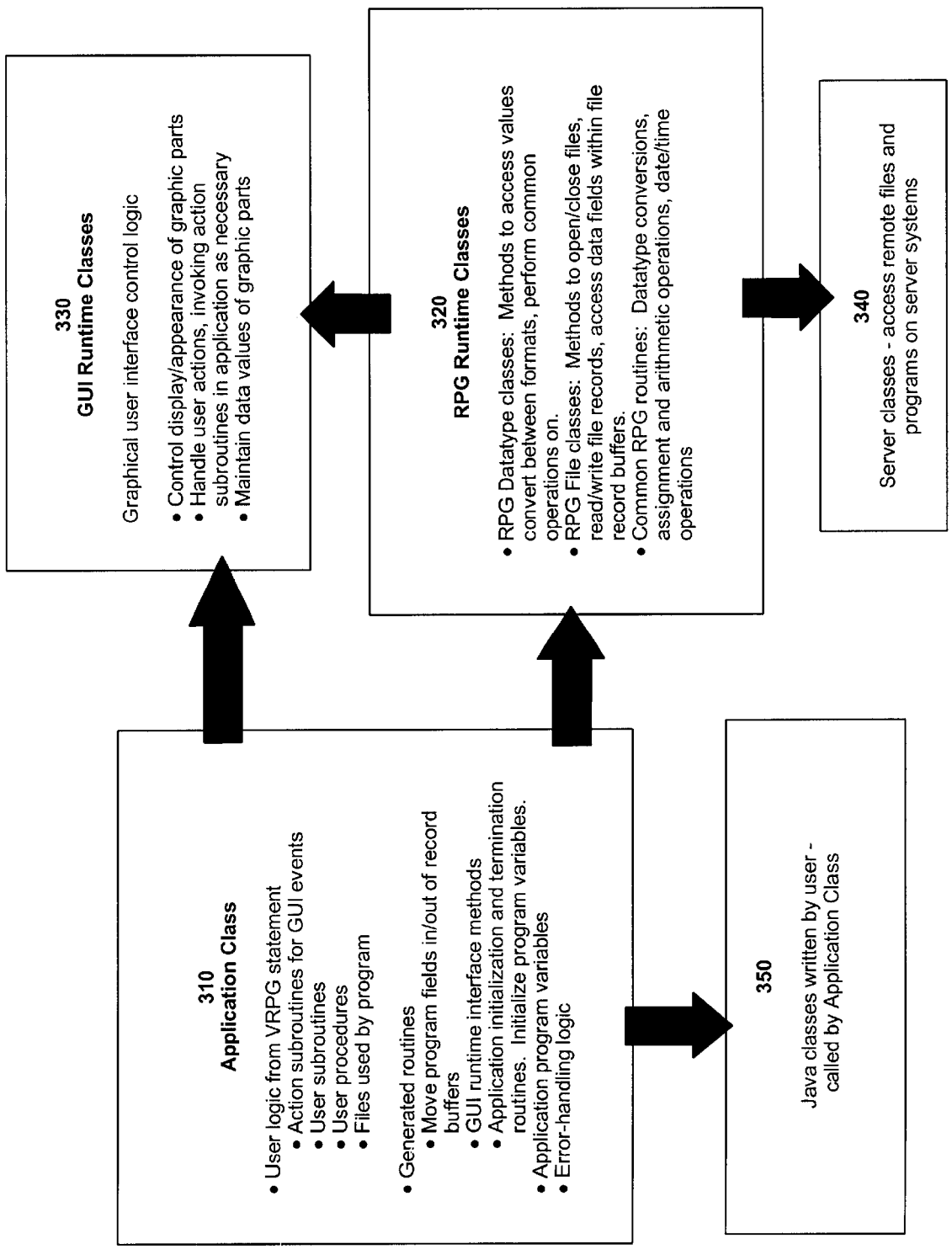

REPORT PROGRAM LANGUAGE SOURCE CODE TRANSLATION TO OBJECT-ORIENTED LANGUAGE SOURCE CODE WHICH EMULATES REPORT PROGRAM LANGUAGE BEHAVIOR

BACKGROUND OF THE INVENTION

1. Field of the Invention

This invention relates generally to the field of high level computer programming languages and translating source code in one computer programming language to source code in another high level language for compilation, and more particularly to the translation of VisualAge® Report Program Generator (VARPG) source code to Java® source code. VisualAge is a trademark of International Business Machines Corporation and Java is a trademark of Sun Microsystems.

2. Description of the Related Art

Businesses have invested money, time, and resources in computers and computer systems which store and access large quantities of data relating to specific matters, such as financial accounts, inventory, customers, employees, etc. Businesses are sensitive to the loss of their investment when new computer technology arises which may result in their investments becoming obsolete. An important consideration, therefore, in introducing new computer technology is adapting it to interface with existing computer technology.

A computer database is the organizational structure in which large quantities of data are stored and managed to facilitate efficient storage, search, retrieval, and use of the data in the database. Computer scientists and other researchers have developed a number of different conceptual models under which databases may be constructed. The most prevalent database model created by business programming languages is known as a relational database. In a relational database the data are typically organized in tables and each data element in a table is indexed by its row and column in the table. The programmer who creates the database has considerable latitude in specifying the rows, columns, keys, and other characteristics that define the schema of a relational database. The above-described data model underlying relational databases was developed to facilitate the storage and retrieval of data under the control of procedural or structured programming languages, such as the Report Program Generator (RPG). Because procedural programming languages and relational databases were for many years being developed and improved upon contemporaneously with one another, procedural languages are well-suited to manipulating relational database data. For example, most procedural programming languages allows a programmer to access an element of a table by specifying its row and column. Although a program would not necessarily access a database element using that feature of the programming language, the point to note is that relational schema and procedural programming share common concepts and programming philosophies.

Another type of programming, known as object-oriented" programming (OOP), is becoming increasingly popular and may eventually supplant procedural programming. OOP languages, such as Smalltalk, C++, and Java, allow programmers to approach their programming tasks in a way that is believed to be more natural and intuitive than the rigidity of the procedural programming languages. A potential problem, however, is that OOP languages do not inherently interface smoothly with relational databases in which businesses may have a substantial investment. For example, the concept of indexing a table of data elements by row and column is in itself somewhat at odds with the OOP philosophy of handling an object in accordance with what it represents rather than how it is represented in a rigid data structure. The goal of OOP is to reduce the time and costs associated with developing complex software by creating small, reusable sections of program code that can be quickly and easily combined and reused to create new programs. The code sections are known as objects. The software object may model the attributes or characteristics of the real-world object and, in many cases, may also model its behavior. For example, an OOP employee object may have certain attributes of a real employee, such as a name, an address, an employee number, and so forth. Exploiting the full capabilities of the OOP source code, the employee object could be used in a program corresponding to the way one would interact with a real employee. For example, the employee object could provide the employee's address when asked for that information or provide the employee's status, e.g., "on vacation," when asked for status information.

Object-oriented databases (OODBs) that are specifically designed to facilitate storage and retrieval of objects have been developed. Objects that are stored in a data store are known as persistent objects because they "persist" after the program that created them ceases executing.

Despite the recent development of dedicated OODBs, businesses have invested billions of dollars over the years in their existing or legacy relational databases so it would be an extraordinarily uneconomical task to transfer all legacy relational data into OODBs. Furthermore, relational databases continue to be viable; they are continuously developed and improved and remain commercially available.

Thus there is a need for object-oriented programming to access and interact with relational databases.

There is also a need to enable programmers skilled in procedural programming languages, such as Report Program Generator, to take advantage of electronic business on the Internet and the world wide web using such object oriented programming as Java applications while in the context of RPG language.

SUMMARY OF THE INVENTION

A computer-implemented method for generating source code in an object-oriented language from a report generator language source code is provided wherein the method comprises the steps of naming a class for the source code in the object-oriented language and generating internal instance variables used in emulating report generator language behaviour in the object-oriented source code. The method further converts global fields of the report generator language to instance variables, and specifications for input/output formats of the report generator language to object-oriented methods for reading and writing records, and a calculation specification to object-oriented methods. A constructor that creates and initializes the global fields, and object-oriented methods for error detection and correction are generated. The method may further comprise generating a main method in the object-oriented language, as well as generating methods to interface with a GUI.

The report generator language may be VARPG and the source may be a NOMAIN project or a VISUAL project, or an EXE project. The object-oriented language to which the projects are converted may be Java. The input/output formats of the report generator language may further be converted to object-oriented methods for reading, writing, clearing, and resetting records and windows.

The invention may further embody a computer-implemented method of calling Java methods from a report program language, comprising the steps of adding an Object datatype to the report program language wherein the Object datatype represents fields that can store a Java object reference. A CLASS keyword is added to the report program language wherein the CLASS keyword specifies the class of the Object datatype. This embodiment further adds an extension of the EXTPROC keyword to the report program language which specifies the name of the Java method to be called and class to which the method belongs.

Yet, the invention may further embody a computer-implemented method converting an RPG project to Java source code comprising the steps of naming a class and then generating internal instance variables used in emulating RPG behaviour in the source code in Java. Global fields of the report generator language are converted to Java instance variables and specifications for input/output formats of the report generator language are converted to Java methods for reading, writing, clearing, and resetting records and windows. A calculation specification is converted to Java methods and a Java constructor that creates and initializes the global fields is generated. Java methods for error detection and correction are also generated. If the RPG project is a VISUAL or an EXE project, a Java main method is also generated. The method may also comprise generating Java methods to interface with a GUI.

The invention may further be embodied in a computer system for converting a procedural language source code to computer source code in an object-oriented language, wherein the computer system comprises a central processing unit and a main memory connected to it with a communication bus network, a data storage unit connected to a data storage interface also connected to the communication bus network, and an input/output device connected to an interface as part of the communication bus network to provide input to the central processing unit. Optionally, the system may be connected to at least one network connection with which to communicate with a remote processor. The system would further comprise a procedural language compiler connected to the main memory and central processing unit wherein the compiler has a class namer to name a class for the object-orient source code, a generator to generator internal instance variables which emulate the procedural language, a global fields converter to convert global fields of the procedural language to instance variables, an I/O specification converter for converting input/output formats of the procedural language source code to object-oriented methods for reading and writing records, a calculation specification converter to convert any calculations in the procedural language source code to object-oriented methods, a constructor generator to generate an object-oriented constructor that creates and initializes the global fields, and an error detector and handler. The computer system would also have an object-oriented computer language compiler connected to the procedural language compiler to compile the object-oriented source code to control the central processing unit.

It is further intended that the invention may also be embodied in a program product for use in a computer system for generating object-oriented source code from a report program source code, with the computer program product having a signal-bearing medium carrying thereon and also having a class namer to name a class for the object-orient source code, an instance variable generator to generate internal instance variables to emulate report program behaviour, a global fields converter to convert global fields of the report generator language to instance variables, an I/O specification converter for converting input/output formats of the report generator language to object-oriented methods for reading and writing records, a calculation specification converter to convert any calculations in the report generator language to object-oriented methods, a constructor generator to generate a constructor to create and initialize global fields, and an error detector and handler.

The objects are further achieved by a computer-implemented method, comprising Java source code which allows Java applications to emulate behavior of report program language source code. The Java source code may comprise Java classes and may comprise any of the following: Component, GuiComponent, RpgLang, RpgNumeric, RpgPacked, RpgZoned, RpgBinary, RpgUnsigned, VarLenFld, RpgFile, DiskFile, PrinterFile, RemoteDiskFile, LocalFile, FixedLengthLocalFile, VarLengthLocalFile, RemoteKeyedDiskFile, RemoteNonKeyedDiskFile, SubfileFile, RpgRemoteCall, RpgDataArea, RpgDate, ExceptionHandler, RpgException, RpgFileException, and RpgEditNumeric.

Applications written in RPG are converted to Java and therefore can run on every platform for which a Java virtual machine exists. Thus, RPG programmers now have the ability to write internet applications. RPG source code is converted to Java source code in such a way that RPG specific behaviors are preserved. Java applications and applets can be written in RPG and existing RPG applications can be converted to Java applets.

BRIEF DESCRIPTION OF THE DRAWINGS

The invention will further be understood by reference to the Drawings in which:

FIG. 2 is a high level flow chart of a method of converting high level report program language to an object oriented language according to principles of the invention; and FIG. 3 illustrates the architecture of the runtime environment and shows the references to object-oriented classes that the generated application class makes according to principles of the invention.

DESCRIPTION OF THE PREFERRED EMBODIMENT

Figure 1:
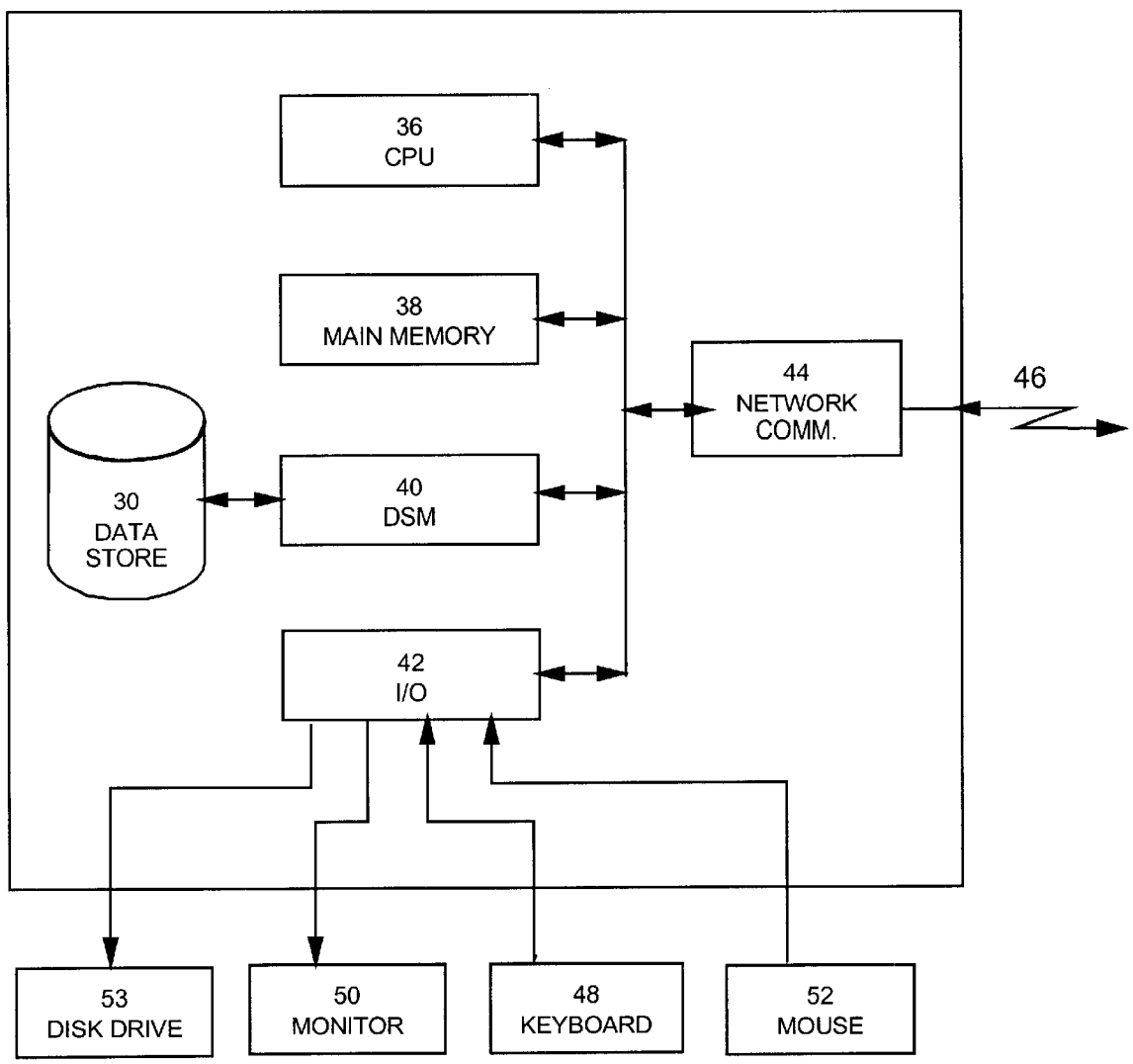
FIG. 1 is a simplified block diagram of a computer apparatus and system capable of taking advantage of the principles embodied in the invention.

An Overview section is provided below for the benefit of readers who are not generally familiar with OOP technology. Readers who understand OOP may wish to skip the Overview section and proceed directly to the Detailed Description.

Overview

OOP differs from standard procedural programming in that it uses objects rather than procedures as the fundamental building blocks for creating computer programs. Both objects and procedures are embodied as sections of code that may be written in a high-level language. Nevertheless, how a programmer uses objects to design programs differs greatly from how a programmer uses procedures. The goal of both OOP and procedural programming is to break a programming task into smaller, more manageable sub-tasks. A procedural programmer may break a program into a hierarchy of procedures, each of which performs an algorithm, the procedures are generally not autonomous. So even though a procedure lower in the hierarchy could be re-used in a different program by a different procedure higher in the hierarchy, the re-use of code is not nearly as straightforward or intuitive as the re-use of objects.

A fundamental concept in OOP is the class. A class is a template or prototype that defines a type of object. A programmer may define a class by writing a section of code known as a class definition. An object is an instance of a class. An object is created or instantiated at runtime, i.e., when the computer executes a statement in the program calling for the instantiation of an object of a specified class. An object may include attributes or data as well as functions or methods. The class definition specifies the attributes and methods. The attributes are represented in an object by the values of instance variables.

Encapsulation, inheritance and polymorphism are three important concepts that differentiate OOP from procedural programming. Encapsulation refers to whether the class is public or private. Often, an object may perform its function without needing to reveal its implementation or internal data. A class definition may specify that the data of objects of that class is private and cannot be accessed by an object of another class. Public data can be accessed by an object of the class or subclass. Objects must communicate with one another via their object interfaces and the data may be encapsulated by limiting access to it through the object interface. Such data can only be modified by the object methods. Inheritance is the ability to derive a new class from one or more existing classes. The new class, known as a subclass, may inherit or incorporate all properties of a base class including its attributes and its methods. The new class or subclass may be defined to include additional properties. Objects communicate with one another by sending and receiving messages. A powerful concept of OOP, known as polymorphism, is that objects of different classes may respond to the same message in different ways.

Another concept that is featured in many OOP languages is known as aggregation or containment by value. A dependent is a type of aggregation. A dependent object differs from other types of objects in that it is not shared. Rather, a dependent object is contained within another object, which may be referred to as an entity to distinguish it from dependents and other classes of objects. A framework is a collection of base classes that extends the power of object-oriented systems. Stated another way, a framework is a set of cooperating classes that make up a usable, extensible architecture. A framework functions as the operating environment. A programmer can use the base classes to derive more specialized classes that represent business objects or entities. A persistent object is one that can be preserved beyond the termination of the process that created that object. A framework that supports persistent objects includes methods that allow persistent objects to be stored in and retrieved from a non-volatile data store, such as a magnetic disk or writeable optical disk. In the environment of a preferred framework, the dependent objects referred to in this specification are only persistent when contained in an entity. That entity "owns" the dependent. The life cycle of a persistent dependent object does not exceed that of its containing entity. When the containing entity is deleted, all of its contained dependent objects are deleted.

DETAILED DESCRIPTION OF THE INVENTION

A suitable server computer is illustrated in FIG. 1 and may be programmed in any suitable manner that effects the functions described herein. The computer includes a central processing unit 36, a main memory 38, a data store manager 40, input/output (I/O) interfaces 42, and network communication interfaces 44. A network communication link 46 connects the computer to other computers, such as the client computer (not shown). A user may interact with source code generator according to principles of the invention via a keyboard 48, monitor 50 and a mouse 52. A removable-media disk drive 53, such as a floppy disk drive is also provided, and may be used for, among other purposes, storing the newly compiled Java code. Although data store 30 is illustrated as being integral to the server computer for purposes of clarity and convenience, it may be remotely located and accessed via network communication link 46. Similarly, the method described herein and/or the converted Java source code may be transmitted to or received from remote computers via network communication link 46.

The difficulties which arise in the translation from a program in one higher level language to a program in another higher level language principally result from the differences in the respective language structures and formats. The application program used as a preferred embodiment for description of the invention is Report Program Generator (RPG). RPG is a computer programming language designed to read and create reports from data base files. VisualAge Report Program Generator (VARPG) is a version of RPG that has a Graphical User Interface (GUI) and is compatible with a Windows® environment (Windows is a trademark of Microsoft Corporation). VARPG is a fixed format language and is comprised of a main program and subprocedures. The main program has a number of specifications in order. First, the control specification defines the type of VARPG project and sets up options for compiling, for arithmetic, for the environment, e.g., date and timestamp formats, etc. Following is the file specification which states what files are to be used. The definition specification then defines the global variables whereas the input specification defines the record format of the files being used. The calculation specification defines the user logic. The output specification defines the record formats of the output files. The main calculation specification is contained in action and user subroutines. User logic can also be contained in subprocedures which are not considered part of the main calculation specification. Subprocedures are analogous to functions in other programming languages.

VARPG has three types of projects. The first is a VISUAL project having a GUI. It has a main calculation specification, i.e., it can contain action subroutines and user subroutines. It can also contain subprocedures. The second project is referred to as NOMAIN which can only contain subprocedures. It does not have a main calculation specification or a GUI. The third project, the EXE project, can only contain subprocedures. One of the subprocedures is considered to be the main subprocedure which allows the EXE project to be run by itself like a batch program. An EXE project does not have a main calculation specification or a GUI.

An RPG compiler, preferably a VARPG compiler, has been modified so that it can generate source code in an object oriented language from VARPG source code. In the preferred embodiment, the example of object oriented language is Java from Sun Microsystems, although it is to be understood that other OOP languages may utilize the principles of the invention. The generated Java source code can then be compiled by any Java compiler to produce a Java class file as an application or applet. RPG behavior is preserved as much as possible in the Java object so that when the application or applet runs, it behaves as an RPG programmer would expect. The RPG specific behavior that has been preserved includes: record I/O, exception handling, most datatypes, and most operation codes. VARPG source code compiled to a Windows object code, and VARPG source code compiled to Java source code and ultimately to a Java application or applet will behave in a similar fashion when run. To preserve some features of the VARPG functionality, minor changes to the VARPG source code may be required. Some RPG features, however, are not supported because the equivalent functionality is not supported in Java.

In FIG. 2, a high level block diagram of the preferred embodiment of the invention is presented. In block 200, the VARPG compiler reads the VARPG source code file, checks the syntax of the code, and generates an intermediate language. Still in block 200 in an extended diagnostics phase, the VARPG compiler checks the semantics and modifies the intermediate language if necessary. Until now, the compiler performs in a typical manner known to those skilled in the art of compilers and intermediate languages. In the code generation phase in block 210, the VARPG compiler generates Java source code, block 220, from the intermediate language. The VARPG compiler then invokes a Java compiler in block 230, specified by the user to compile the generated source code to a Java class file in block 240. The code generation phase 210 of the compiler has been enhanced so that if the compiler is invoked with the Java compile option (/j), the target of the compilation is a Java source file and a Java class file. The user can specify what Java compiler they would like to use for the Java compilation. If none is specified, the Java compiler from Sun Microsystems is assumed.

The generated Java class file makes heavy use of the VARPG compiler runtime, which in turn makes use of the VARPG GUI runtime and VARPG host services layer, preferably a modified version of the AS/400® Java Toolbox (AS/400 is a trademark of International Business Machines Corporation). Both the VARPG compiler runtime and the VARPG GUI runtime have been translated to Java for this purpose. The generated class file also requires several standard Java class files to run.

FIG. 3 is another high level block diagram of an embodiment of the invention. In Block 310, a VARPG application class has aspects which must be considered when generating Java source code. The user logic from VARPG statements includes action subroutines for GUI events, user subroutines and subprocedures. User logic also references files used by the program. The generated Java program may move program fields in and out of file record buffers, must include GUI runtime interface methods, and may have initialization routines which initialize program variables and the application, as well as termination routines. If the application program itself has variables, the Java source code must also accommodate these variables and there must be logic for error detection and correction. To accommodate VARPG behavior, the application class use runtime classes 320 which include common RPG routines, RPG file classes and RPG datatype classes. Java GUI runtime classes 330 were also created for Visual projects to control the display and appearance of graphic parts, handle user actions, invoke the action subroutines as necessary, and maintain data values of graphic parts. Toolbox classes 340 uses files and calls programs of a server operating system and classes 350 which are written by the user are called by an application class.

The VARPG Runtime Classes

A key feature of this embodiment of the invention is the creation of the following Java runtime classes which preserve VARPG behavior when running the application class. A brief description of the class is presented.

Component class
Instantiated by the constructor for the VARPG application class for NOMAIN and EXE components. Used for component wide operations, such as indicating what state the component is in.

GuiComponent class
Extends Component class. Instantiated when initializeComponent is called for Visual RpgNumeric
This class holds almost all of the methods required to perform operations involving the Packed, Zoned, Binary, and Unsigned numeric data types, as well as some static methods that can be called when manipulating float data. A BigDecimal instance variable contains the value of the numeric. Two int variables contain the declared number of digits and decimal places for the VARPG field.

RpgPacked
Extends RpgNumeric class. Contains all the methods specific to dealing with the Packed Decimal data type.

RpgZoned
Extends RpgNumeric class. Contains all the methods specific to dealing with the Zoned Decimal data type.

RpgBinary
Extends RpgNumeric class. Contains all the methods specific to dealing with the Binary data type.

components. Contains all the methods used for performing GUI operations.

RpgLang
This class holds most of the methods required by the pure RPG language. For example, methods implementing MOVEL would be in this class. All of the methods in this class are static methods. It is used extensively by the generated Java source code, especially for character operations.

PrinterFile
Extends RpgFile, Contains the methods and data required to support PRINTER files.

RemoteDiskFile
Extends DiskFile. Contains the methods and data common to host files.

LocalFile
Extends DiskFile. Contains the methods and data common to local files.

FixedLengthLocalFile
Extends LocalFile. Contains the methods and data required to support local files with fixed length records.

VarLengthLocalFile
Extends LocalFile. Contains the methods and data required to support local files with varying length records.

RemoteKeyedDiskFile
Extends RemoteDiskFile. Contains the methods and data required to support keyed host files.

-continued

RpgUnsigned
Extends RpgNumeric class. Contains all the
methods specific to dealing with the Unsigned
data type.
VarLenFld
Contains all the methods required to support the
Varying Length Character datatype. The length
is saved in an instance variable of type int. A
byte array contains the data. The size of the byte
array is equal to the maximum size declared for
the VARPG varying length field.

RpgFile
Contains the methods and data common to all
VARPG file types.

DiskFile
Extends RpgFile. Contains the methods and
data common to DISK files.
RpgDate
This class contains all the methods required to
support the Date, Time, and Timestamp data
types. All of the methods in this class are static.

ExceptionHandler
This class contains all of the methods required to
support VARPG-like exception handling.

RemoteNonKeyedDiskFile
Extends RemoteDiskFile. Contains the methods and
data required to support non-keyed host files.

SubfileFile
Contains the methods required to support GUI
subfiles.

RpgRemoteCall
This class contains the methods required to perform
a call to a program on the host, and also the methods
required to retrieve the host time. All of the methods
in this class are static.

RpgDataArea
This class contains the data and methods required to
support data areas. It uses the RpgRemoteCall class
to call the VARPG program on the host which
actually performs the data area operations.
RpgException and RpgFileException
These two objects are constructed when an
exception occurs.

RpgEditNumeric
This class is used to edit numeric data for
output. All of the methods in this class are static.

Mapping of VARPG Datatypes to Java Datatypes

VARPG datatypes are converted or mapped to Java datatypes. A byte array was chosen for character data over StringBuffer or char array to ensure the length of the field remains static throughout execution of the program. The use of byte array also maintains the same number of bytes of storage as the equivalent VARPG datatype. Because there is no equivalent Java datatype for numeric types Binary, Packed, Zoned, and Unsigned, these datatypes are represented by runtime classes that are all subclassed from the class RpgNumeric which contains the bulk of the methods to support their RPG behavior. These subclasses ensure that both the whole number portion and the precision of the numeric value fits into the declared size for the field.

In VARPG, null capable fields are implemented as a field value and a separate indicator value which indicates if the field should be considered to have a null value at the moment. The Java source code conversion implements a similar design. Null-capable fields are handled as if they were normal fields but are provided with a separate null indicator value. This null indicator is set and used when the field is read or written to a corresponding null capable field in the remote server, preferably an AS/400, file. The null indicator value is available to the application programmer for checking, and setting, just as it is when targeting a Windows object.

The mapping of VARPG datatypes to Java datatypes is presented in the following table.

| VARPG Datatype | Datatype on D-spec | Size | Java Datatype |
|---|---|---|---|
| Fixed Character (xA) | x*A | x | byte[] |
| Varying Character (xA) | xA VARYING | x | VarLenFId class |
| Indicator | N | 1 | byte[] |
| Date, Time, Timestamp | D, T, Z | Depend on format | byte[] |
| Binary | xB | | RpgBinary class |
| Float | 4F or 8F | | float or double |
| Integer | 5I or 10I | | short or int |
| Packed | xP | | RpgPacked class |
| Unsigned | 5U or 10U | | RpgUnsigned class |
| Zoned | xS | | RpgZoned class |
| Graphic | xG | | NOT SUPPORTED |

*x is the number of characters or digits.

Translation of Operation Codes

The vast majority of VARPG operation codes are executed by calling into one of the runtime classes. The methods in the runtime classes have been implemented in such a way that the expected VARPG behavior will occur when the operation is executed. When the VARPG source code calls a non-Java external procedure, such as a C function, the appropriate Java source code is generated for a function call through the Java Native Interface (JNI). The application programmer is responsible for providing the appropriate call target program on the native system side, in accordance with the JNI specifications.

| | | |
|---|---|---|
| ADD For RpgNumeric types, method in RpgNumeric class. For other types, Java + operator | converted to methods. BEGSR All user subroutines are converted to methods. | CALL Method in RpgRemoteCall class. CALLP If to subprocedure or Java |

-continued

| | | |
|---|---|---|
| ADDDUR Method in RpgDate class | BITOFF Method in RpgLang class. | method, then a method call. If to a native (non-Java) function, then a Java Native Interface call (see below). |
| ANDxx Java && operator | BITON Method in RpgLang class. | |
| BEGACT All action subroutines are CASxx Java logical operator, depending on xx. | DOUxx Java do-while statement | KLIST As for Windows (compile time operation) |
| CAT Method in RpgLang class. | DOW Java while statement | LEAVE Java break statement |
| CHAIN Method in the appropriate RpgFile class. | DOWxx Java while statement | LOOKUP Method in RpgLang class |
| CHECK Method in RpgLang class. | DSPLY Method in GuiComponent class. | MOVE Method in RpgLang or RpgDate. Method used depends on the datatypes of the source and target of the operation. |
| CHECKR Method in RpgLang class. | ELSE Java else statement | |
| CLEAR If clearing a record, method in the generated Java class. | ENDyy Java end block (}) | MOVEA Method in RpgLang class |
| If clearing a window, generated method in the Java class which in turn uses a method in the GuiComponent class. If clearing a field, inline Java code, method in RpgNumeric class, or method in RpgDate class. | ENDACT Java end method (}) | MOVEL Method in RpgLang or RpgDate. Method used depends on the datatypes of the source and target of the operation. |
| | ENDSR Java end method (}) | |
| | EVAL Assignment is done according to datatype. RPG behaviour is preserved, meaning that numerics retain their attributes and character fields retain their length. | MULT For RpgNumeric types, method in RpgNumeric class--For other types, Java * operator. |
| CLOSE Method in appropriate RpgFile class. | | |
| CLSWIN Method in GuiComponent class. | EXCEPT Except method is generated containing calls to the output method for each record to be written when the EXCEPT occurs. | MVR For RpgNumeric types, method in RpgNumeric class. For other types, remainder is calculated based on operands to previous DIV operation, which were saved. |
| COMMIT Method in appropriate RpgFile class. | EXSR Java method invocation | |
| COMP If a native Java type, inline code. If numeric, method in RpgNumeric class. If DTZ, method in RpgDate class. If character, method in RpgLang class. | EXTRCT Method in RpgDate class | OCCUR Java integer assignment OPEN Method in appropriate RpgFile class |
| | FEOD Method in appropriate RpgFile class | |
| | GETATR Method in GuiComponent class | ORxx Java II operator |
| DEFINE As for Windows (compile time operation) | | OTHER Java default case or final else clause |
| DELETE Method in appropriate RpgFile class | IF Java if statement | OUT Method in RpgDataArea class. |
| | IFxx Java if statement | |
| DIV For RpgNumeric types, method In RpgNumericclass. For other types, Java/operator. | IN Method in RpgDataArea class | PARM As for Windows (compile time operation) |
| | ITER Java continue statement | PLIST As for Windows (compile time operation) |
| DO Java do statement | KFLD As for Windows (compile time operation) | POST Appropriate method in RpgFile class |
| DOU Java do-while statement | SETATR Method in GuiComponent class | TESTN Method in RpgLang class. |
| READ If reading a record, method in the appropriate RpgFile class. If reading a window, generated method in the Java class which in turn uses a method in the GuiComponent class. | SETGT Appropriate method in RpgFile class. | TESTZ Method in RpgNumeric class. |
| | SETLL Appropriate method in RpgFile class. | TIME If local time, method in RpgDate class. If time from host, method in RpgRemoteCall class. |
| READC Method in SubfileFile class. | SETOFF Inline Java code | UNLOCK Method in appropriate RpgFile class. |
| READE Method in RemoteKeyedDiskFile class. | SETON Inline Java code | UPDATE Method in appropriate RpgFile class. |
| READP Method in the appropriate RpgFile class. | SHOWWIN Method in GuiComponent class | |
| READPE Method in RemoteKeyedDiskFile class. | SORTA Method in RpgLang class | WHEN Java if/else if/else statement |
| READS Method in SubfileFile class. | SQRT For RpgNumeric types, method in RpgNumeric class. For other types, method in Java Math class. | WHENxx Java if/else if/else statement |
| RESET If resetting a record, method in the generated Java class. If resetting a window, generated method in the Java class which in | START Method in GuiComponent class | WRITE If writing a record, method in the appropriate RpgFile class. If writing a window, generated method in the Java class which in turn uses a method in the GuiComponent class. |

-continued

| | | |
|---|---|---|
| turn uses a method in the GuiComponent class. If resetting a field, inline Java code, method in RpgNumeric class, or method in RpgDate class. | STOP Method in GuiComponent class | XFOOT Inline Java code in conjunction with any methods used for ADD |
| | SUB For RpgNumeric types, method in RpgNumeric class. For other types, Java-operator | XLATE Method in RpgLang class. |
| RETURN Java return statement | | Z-ADD For RpgNumeric types, method in RpgNumeric class. For other types, Java assignment operator. |
| ROLBK Method in appropriate RpgFile class. | SUBDUR Method in RpgDate class. | |
| SCAN Method in RpgLang class. | SUBST Method in RpgLang class. | Z-SUB For RpgNumeric types, method in RpgNumeric class. For other types, Java assignment operator. |
| SELECT Java if/else if/else statement | TEST Method in RpgDate class. TESTB Method in RpgLang class. | |

Translation of Builtin Functions

As for operation codes, most of the Builtin functions are evaluated by calling into the runtime classes.

Exception Handling

When an RPG runtime error occurs, the RPG compiler first checks for an error indicator or error operation code

| | | |
|---|---|---|
| % ABS Depending on the type, either a method in RpgNumeric class or in the Java Math class. | class. | % STATUS Method in RpgFile class or in line Java code, depending on if a file parameter is present. |
| | % FOUND Inline Java code. | |
| % CHAR A non-operation | % GETATR Method in GuiComponent class. | % SUBST Method in RpgLang class. |
| % DEC Method in RpgNumeric class | % INT Depending on the datatype of the operand, method in RpgNumeric or Java Math class. | % TRIM Method in RpgLang class. |
| % DECH Method in RpgNumeric class | | |
| % DECPOS Same as in Windows (compile time function) | % INTH Depending on the datatype of the operand, method in RpgNumeric or Java Math class. | % TRIML Method in RpgLang class. |
| % EDITC Method in RpgEditNumeric class. | | % TRIMR Method in RpgLang class. |
| % EDITFLT Method in RpgNumeric class. | % LEN Either a compile-time operation, or the length attribute of a byte array. | % UNS Depending on the datatype of the operand, method in RpgNumeric or Java Math class. |
| % EDITW Method in RpgEditNumeric class. | % OPEN Method in RpgFile class. | % UNSH Depending on the datatype of the operand, method in RpgNumeric or Java Math class. |
| % EOF -- method in RpgFile class. | % REPLACE Method in RpgLang class. | % ELEM Same as in Windows (compile-time function) |
| % EQUAL Inline Java code | % SCAN Method in RpgLang class. | |
| % ERROR Inline Java code | | % NULLIND Inline Java code |
| | % SETATR Method in GuiComponent class. | % SIZE Same as in Windows (compile-time function). |
| % FLOAT Depending on the datatype of the operand, method in RpgNumeric or Java Math | | |

Implementation of Host (Remote) Files

The method of generating Java source code from VARPG code described herein may be implemented on any server, preferably an AS/400. The actual source conversion occurs on a Windows platform, although the invention could be implemented on any platform. The AS/400 Toolbox for Java provides Java class support for AS/400 database file access and AS/400 program calls and so the VARPG runtime classes that support host file operations also use the AS/400 Toolbox for Java support. The AS/400 Toolbox classes have been enhanced to support a full range of RPG file operations. The runtime uses the AS/400 Toolbox classes. The generated Java source code handles field movement between program values and record buffers but still calls VARPG runtime class methods for file operations.

extender. If the error indicator or error operation code extender is present, it is set and the method continues to execute from the next RPG statement. If there is no error indicator or error operation code extender there is a check for the Program Status SubRoutine (*PSSR). If the subroutine is present, then the method will call it and the user will indicate where control should resume in the VARPG code. If neither the error indicator or error operation code extender nor the *PSSR is present, the default exception handler is called. The default exception handler displays an error message in a dialog box and the user will respond to several choices. This behavior must be maintained in the Java application. An implementation with C uses setjmp/longjmp whereas in Java, the try/catch model must be used.

Two exception subclasses were designed: a general RPG exception class and a file error specific class. These exceptions occur when errors are detected both in the generated Java source code and in the VARPG runtime classes. Java source code is generated to handle the exceptions according to the presence of error indicator or error operation code extenders, and presence of a *PSSR subroutine (INFSR subroutine for file errors).

Generation of Java Source Code from VARPG Source Code

The creation of the basic building blocks for the generation of the Java source code from the VARPG source code have been delineated. Now it is time to see how the RPG compiler actually generates the Java source code from RPG source code. In designing the generated source code, the following decision points are maintained: (1) structure of the generated Java source; (2) the VARPG runtime classes; (3) exception handling; (4) datatypes; (5) translation of operation codes; and (6) translation of builtin functions.

The Java source code generated from the VARPG source code is based on one of the following models, depending on the type of VARPG project. The italicized lines of code below represents a sample skeleton of the generated Java source code. Recall that VARPG has three components or project types: VISUAL, NOMAIN, and EXE.

For a VARPG VISUAL project, a component name is given to the Java public class that will be generated.

public class <ComponentName>
    {

The VARPG compiler then generates the Java instance variables, which most likely are private but in some instances could be public. These instance variables are internal variables which preserve the VARPG behaviour in the Java source code and are generated for every application.

//Compiler generated instance variables
    private . . .
    private . . .

All the VARPG global fields are converted to Java instance variables.

//All global fields are converted to instance variables
    private . . .
    private . . .

The VARPG compiler than generates the main method, i.e., the main initialization function.

//main method starts the GUI runtime and exits
    public static final void main( )

The translation then converts the input and output specifications of the VARPG project. In Windows, this stage is usually invisible to the user but with the program herein described the input and output specifications are exposed.

//Methods for reading and writing records and windows and
    //methods for clearing and resetting records and windows
    private internalMethod1( . . . )
    private internalMethod2( . . . )

The action subroutines and user subroutines, that contain calculation specifications, are converted to Java methods.

//Action subroutines and user subroutines
    public actionSubroutine1( . . . )
    public actionSubroutine2( . . . )
    private subroutine1( . . . )
    private subroutine2( . . . )
    //Subprocedures
    private procedure1( . . . )
    private procedure2( . . . )

Then, a constructor method for the application class is generated. The constructor instantiates and initializes the global variables.

//Constructor
    public ComponentName( )

The methods required for interfacing with the GUI runtime are generated. These methods are not generated from user logic, i.e., they are not present in the VARPG source code.

//Methods required for interfacing with GUI runtime
    public initializeComponent
    public queryVersion
    public componentInitialized
    public closingComponentObjects
    public terminatingComponent
    public processActionSubroutine Last, a method to handle errors is generated.

//Methods required for exception handling
    private handleException( . . . )
}

For a VARPG NOMAIN project, the code generation phase does not generate any Java source code for the main method, for running or interfacing with GUI runtime, or for the action and user subroutine calculation specification because a NOMAIN project does not have these functions. Therefore, code generation for a NOMAIN project is simplified.

public class <ComponentName>
    {
    //Compiler generated instance variables
    private . . .
    private . . .
    //All global fields are converted to instance variables
    private . . .
    private . . .
    //Methods for reading and writing records and windows and
    //methods for clearing and resetting records and windows
    private internalMethod1( . . . )
    private internalMethod2( . . . )
    //Subprocedures. Private if not EXPORTed, public if EXPORTed
    private/public subprocedure1( . . . )
    private/public subprocedure2( . . . )
    //Constructor
    public ComponentName( )
    //Methods required for exception handling
    private handleException( . . . )
}

For a VARPG EXE project, the code generation phase does not generate any Java source code for running or interfacing with GUI runtime because an EXE project does not have these functions. Therefore, code generation for a EXE project is also simplified. Note that for both NOMAIN and EXE components, any initialization that is normally performed in the initializeComponent method of VISUAL projects takes place in the constructor.

public class <ComponentName>
    //Compiler generated instance variables
    private . . .
    private . . .
    //All global fields are converted to instance variables
    private . . .
    private . . .

```
//Methods for reading and writing records and windows
    and
//methods for clearing and resetting records and windows
    private internalMethod1( . . . )
    private internalMethod2( . . . )
//main method
    public staticfinal <type> main( . . . )
//Subprocedures. private if not EXPORTed, public if
    EXPORTed
    private/public subprocedure1( . . . )
    private/public subprocedure2( . . . )
//Constructor
    public ComponentName( )
//Methods required for exception handling
    private handleException( . . . )
}
```

For all component types, the compiler generated instance variables which preserve the VARPG behaviour include:

```
//The indicator array (*1N01 to *1N99, LR)
byte[] indicatorArray[ 100];
//One of the following
Component           varpgComponent       //NOMAIN and EXE
GuiComponent        varpgComponent       //GUI components
//For exception handling
ExceptionHandler    varpgExceptionHandler;
//For exception handling
int                 lineNum;
//For interfacing with the VARPG toolbox
RemoteServerTable   rstFile
```

Calling Java Methods

It is useful to call Java methods from RPG. In order to do so, the VARPG compiler needs to know the following information: (a) the name of the method; (b) a syntax to specify a class name and a method signature; (3) if the method returns an object, the class of the returned object; (4) whether the method is a static method; and (5) the datatypes of the parameters passed to the method. If the method, moreover, is not a static method, then an object must be instantiated in order to call the method. If the method returns an object, then the compiler must have somewhere to store the returned object. If the method requires an object as a parameter, then there must be some way to create that object. One way to accomplish this is to add to the VARPG language the following: (a) the Object datatype; (b) the CLASS keyword; and an extension of the EXTPROC keyword.

Fields that can store objects are declared using the new 'O' datatype. When declaring a field of type 'O', 'O' must be coded in column 40 of the D-specification, and the class of the object must be provided using the new CLASS keyword. The CLASS keyword accepts two parameters: CLASS (*Java:class name), where *Java identifies the object as a Java object, the class name specifies the class of the object. The class must be a character literal, and the class name must be fully qualified. The class name is case sensitive. To declare a field that will hold an object of type BigDecimal:

D bdnum S O CLASS(*JAVA: 'java.math.BigDecimal')
To declare a field that will hold an object of type String:

D string S O CLASS(*Java: 'java.lang.String')
Notice that both class names are fully qualified and that their case exactly matches that of the Java class. Fields of type O cannot be defined as subfields of data structures. It is possible to have arrays of type O fields but type O tables are not allowed because tables have to be preloaded at runtime. Certain keywords cannot be used with the CLASS keyword.

The EXTPROC keyword has been extended and is used to specify the name of the method and the class to which it belongs. When prototyping a Java method, the expected format of the EXTPROC keyword is: EXTPROC(*JAVA or *JAVARPG:class name:method name) where *JAVARPG identifies the method as a Java method that was generated using VARPG. *JAVA identifies the method as a Java method that was generated from code originally written in Java, that is, not through VARPG. This distinction is important because methods generated from VARPG will allow certain datatypes to be passed by reference that normally cannot be passed by reference in Java. This allows the same source code to be used when targeting Windows and when generating Java source code. Both the class name and the method name must be a character literal. The class name must be a fully qualified Java class name and the method name must be the name of the method to be called; both are case sensitive. The extended form of the EXTPROC keyword can only be used when calling Java methods and will result in a compiler error if targeting Windows.

The datatypes of the parameters and the return value of the method are specified in the same way as they are when prototyping a subprocedure. The only twist on this is that the datatypes actually map to Java datatypes. The compiler maps VARPG datatypes to Java datatypes in the following way:

| Java datatype | VARPG datatype | |
| --- | --- | --- |
| boolean | indicator | (N) |
| byte[] | alpha | (A of any length) |
| int | integer | (10I) |
| short | integer | (5I) |
| float | float | (4F) |
| double | float | (8F) |
| any object | object | (O) |

Zoned, Packed, Binary, and Unsigned datatypes do not appear in the table because these datatypes are not available in Java. If a Zoned, Packed, Binary, or Unsigned field is passed as a parameter, the VARPG compiler will do the appropriate conversion, but this will most likely result in truncation and/or loss of precision. If*JAVARPG has been specified as the first parameter of the EXTPROC keyword, meaning that the method being called was generated by VARPG, then Packed, Zoned, Binary, and Unsigned datatypes can be specified as the datatype of parameters and return values. This can only be done for methods generated by VARPG. Methods generated from code originally written in Java do not have the capability to accept or return Packed, Zoned, Binary, and Unsigned fields. When calling a method, the compiler accepts arrays as parameters if the parameter is prototyped using the DIM keyword. Otherwise, only scalar fields, data structures, and tables will be accepted.

If the return value of a method is an object, then the class of the object must be provided. This is done by coding the CLASS keyword on the prototype. The class name specified will be that of the object being returned. The class of the method being called is specified using the EXTPROC keyword.

If the method being called is a static method, then the STATIC keyword must be specified on the prototype.

In Java, some datatypes can only be passed by value. Datatypes that can only be passed by value are: int, short, float, and double. Parameters of these types must have the VALUE keyword specified for them on the prototype. If *JAVARPG has been specified as the first parameter of the EXTPROC keyword, meaning that the method being called was generated by VARPG, then these datatypes can be passed by reference and so the VALUE keyword is not required. Note that objects can only be passed by reference. The VALUE keyword cannot be specified with type 'O' Since arrays are seen by Java as objects, parameters mapping to arrays must also be passed by reference. This includes byte arrays.

EXAMPLES OF PROTOTYPING JAVA METHODS

Example 1

The Java Integer class contains a static method called toString, which accepts an int parameter, and returns a String object.

```
           String              Integer.toString (int)
This method would be prototyped as follows:
D    tostring    PR    O    EXTPROC(*JAVA:'java.lang.Integer':
D                            'toString')
D                            CLASS('*JAVA':'java.lang.string')
D                            STATIC
D    num          10I 0  VALUE
```

In the above example, the EXTPROC keyword tells the compiler that the method was not generated by VARPG. It also indicates that the method name is 'toString', and that it is found in class 'java.lang.Integer. The 'O' in column 40 and the CLASS keyword tell the compiler that the method returns an object, and the class of that object is 'java.lang.String'. The STATIC keyword tells the compiler that the method is a static method, meaning that an Integer object is not required to call the method. The datatype of the parameter is specified as 10I, which maps to the Java int datatype, and because the parameter is an int, it must be passed by value, and hence the VALUE keyword is specified.

Example 2

This method accepts two objects as parameters. 'O' is coded in column 40 of the D-specification, and the CLASS keyword specifies the class of each object parameter. The Java Integer class contains a static method called getInteger, which accepts String and Integer objects as parameters, and returns an Integer object.

Integer Integer.getInteger(String, Integer)

This method would be prototyped as follows:

```
D    getint    PR    O    EXTPROC(*JAVA:'java.lang.Integer':
D                          'getInteger')
D                          CLASS('*JAVA':'java.lang.Integer')
D                          STATIC
D    string         O     CLASS(*JAVA:'java.lang.String')
D    num            O     CLASS(*JAVA:'java.lang.Integer')
```

Example 3

The Java Integer class contains a method called shortValue, which returns the short representation of the Integer object used to invoke the method. The STATIC keyword is not specified because the method is not a static method. The method takes no parameters, so none are coded. The return value is specified as 5I, which maps to the Javashort datatype.

```
           short              shortValue()
This method would be prototyped as follows:
D    shortval    PR    5I 0    EXTPROC(*JAVA:'java.lang.Integer':
D                              'shortValue')
```

Example 4

The Java Integer class contains a method called equals, which accepts an Object as parameter and returns a boolean. The return value is specified as N, which maps to the Java boolean datatype.

```
     boolean    equals(Object)
This method would be prototyped as follows:
D    equals    PR    N    EXTPROC (*JAVA:'java.lang.Integer':'equals')
D    obj             O    CLASS (*JAVA:'java.lang.Object')
```

Creating Objects

In order to call a method that is not static, an object is required. The class of the object must be the same as the class containing the method. Objects are instantiated, or created, by calling the class constructor. The class constructor is not a static method, but it does not require an object to call it. The special method name *CONSTRUCTOR is used when prototyping a constructor.

```
For example: In order to construct a BigDecimal object from a float
value, the constructor expects that a float parameter must be called. Notice
that the parameter must be passed by value because it maps to the
Java float datatype.
     BigDecimal(float) returns a new BigDecimal object
D    bdcreate  PR  O    EXTPROC(*JAVA:'java.math.BigDecimal':
D                        *CONSTRUCTOR)
D                        CLASS(*JAVA:'java.math.BigDecimal')
D    dnum          4F    VALUE
```

Calling Java Methods

Java methods will be called using existing operation codes CALLP when no return value is expected and EVAL when a return value is expected. No new syntax is required. When calling a static method, an object is not required in order to make the call. But when calling a method that is not static, an object is required. The object to be used must be coded as the first parameter in the call. This parameter is not specified on the prototype, but is implied for all methods that are not static. This means that whenever a method that is not static is called, a minimum of one parameter must be specified.

Example: In this example, the goal is to add two BigDecimal values together. In order to do this, two BigDecimal objects must be instantiated by calling the constructor for the BigDecimal class, fields must be declared to store the BigDecimal objects, and the add() method in the BigDecimal class must be called.

```
D*
D*         Prototype the BigDecimal constructor that accepts a String parameter. It returns a
D*         new BigDecimal object.
D*
D    bdcreate1      PR    O         EXTPROC(*JAVA:'java.math.BigDecimal':
D                                   *CONSTRUCTOR)
D                                   CLASS(*JAVA:'java.math.BigDecimal')
D    str                  O         CLASS(*JAVA:'java.lang.String')
D*
D*         Prototype the BigDecimal constructor that accepts a double parameter, 8F maps to the
D          Java double datatype and so must be passed by VALUE. It returns a BigDecimal
D          object.
D*
D    bdcreate2      PR    O         EXTPROC(*JAVA:'java.math.BigDecimal':
D                                   *CONSTRUCTOR)
D                                   CLASS(*JAVA:'java.math.BigDecimal')
D    double               8F        VALUE
D*
D*         Define fields to store the BigDecimal objects
D*
D    bdnum1         S     O         CLASS(*JAVA:'java.math.BigDecimal')
D    bdnum2         S     O         CLASS(*JAVA:'java.math. BigDecimal')
D*
D*         A constructor requiring a String object will have to be constructed. Prototype the
D*         String constructor that accepts a byte array as a parameter. It returns a String object.
D*
D    makestring     PR    O         EXTPROC(*JAVA:'java.lang String':.
D                                   *CONSTRUCTOR)
D                                   CLASS(*JAVA:'java.lang.String')
D    bytes                10A
D*
D*         Define a field to store the String object.
D*
D    string         S     O         CLASS(*JAVA:'java.lang.String')
D*
D*         Prototype the BigDecimal add method. It accepts BigDecimal object as a parameter and
D*         returns a BigDecimal object (the sum of the parameter and of the BigDecimal object used
D*         to make the call.
D*
D    add            PR    O         EXTPROC(*JAVA:'java.lang.BigDecimal':
D                                   'add')
D                                   CLASS(*JAVA:'java.math.BigDecimal')
D    bd1                  O         CLASS(*JAVA:'java.math BigDecimal').
D*
D*         Define a field to store the sum.
D*
D    sum            S     O         CLASS(*JAVA:'java.math.BigDecimal')
D    double         S     8F        INZ(1.1)
D    fld1           S     10A
Here is the code that does the call:
C                          MOVEL     'mystring''   fld110
C*
C*         Call the constructor for the String class, to create a String object from fld1. Because we are
C*         calling the constructor, we do not need to pass a String object as the first parameter.
C*
C                          EVAL      string = makestring(fld1)
C*
C*         Call the BigDecimal constructor that accepts a String parameter, using the String object we
C*         just instantiated.
C*
C                          EVAL      bdnum1 = bdcreate1(string)
C*
C*         Call the BigDecimal constructor that accepts a double as a parameter.
C*
C                          EVAL      bdnum2 = bdcreate2(double)
C*         Add the two BigDecimal objects together by calling the add method. The prototype
C*         indicates that add accepts one parameter, but because add is not a static method, we must
C*         also pass a BigDecimal object in order to make the call, and it must be passed as the first
C*         parameter. The object bdnum1 is used to make the call, and bdnum2 is the parameter.
C*
C                          EVAL      sum = add(bdnum1:bdnum2)
C*         Sum contains a BigDecimal object with the value bdnum1 + bdnum2.
```

To do a TRIM using Java instead of the VARPG %TRIM BIF, the trim( ) method found in the String class may be used. The trim( ) method is not a static method so a String object is needed to call the method.

```
D*
D*        Define a field to store the String object we wish to trim
D*
D         str          S    O         CLASS(*JAVA:'java.lang.String')
D*
D*        Prototype the constructor for the String class. The constructor expects a byte array.
D*
D         makestring   PR   O         EXTPROC(*JAVA:'java.lang.String':
D                                     *CONSTRUCTOR)
D                                     CLASS(*JAVA:'java.lang.String')
D         parm              10A
D*
D*        Prototype the String method getBytes which converts a String to a byte array. We can then
D*        store this byte array in an alpha field.
D*
D         makealpha    PR   10A       EXTPROC(*JAVA:jJava.lang.String':
D                                     getBytes')
D*
D*        Prototype the String method trim. It doesn't take any parameters, but since it is not a static
D*        method, must be called using a String object.
D*
D         trimstring   PR   O         EXTPROC(*JAVA:'java.lang.String':'trim')
D         fld          S    10A       INZ(' hello ')
Now do the actual call.
C*
C*        Call the String constructor.
C*
C                           EVAL      str = makestring(fld)
C*
C*        Trim the string by calling the String trim() method.
C*        We will reuse the str field to store the result.
C*
C                           EVAL      str = trimstring(str)
C*
C*        Convert the string back to a byte array and store it in fld.
C*
C                           EVAL      fld = makealpha(str)
```

Static methods are called in the same way, except that an object is not required to make a call. If the makealpha method above was static, the call would look like:
  C EVAL fld=makealpha( )
CALLP is used when the method does not have a return value The compiler will not attempt to resolve classes at compile time. If a class cannot be located at run time, a run time error will occur. It will indicate that an UnresolvedLinkException object was received from the Java environment. The compiler does not do any type checking of parameters at compile time. If there is a conflict between the prototype and the method being called, an error will be received at run time. It is very important that *JAVARPG be specified as the first parameter of EXTPROC if the method being called has been generated from VARPG. If this is not done, it is likely that one of the above two error situations will occur.

Restrictions and Run Time Behaviour Differences When Generating Java Source Code The following VARPG language elements are not supported when generating Java source code:

| Keywords: | OVERLAY |
| | ALIGN |
| | STATIC on field definitions. STATIC is supported on Java method prototypes. |
| | EXPROPTS |

-continued

| | | |
|---|---|---|
| Operation codes: | TAG | |
| | GOTO | |
| | CABxx | |
| | ALLOC | |
| | REALLOC | |
| | DEALLOC | |
| | CALLB | |
| | DSPLY (not supported for NOMAIN and EXE only, it is supported otherwise) | |
| Operation extenders: | M | |
| | R | |
| Datatypes: | Pointer datatype | |
| File types: | SPECIAL | |
| File operations: | Writing records by relative record number | |
| Language Features: | Embedded SQL statements. | |

In order to generate the Java source code, some changes may be required to the VARPG source. For instance, To/from notation is not allowed when defining data structure subfields. Exceptions to this are when defining subfields of the PSDS and INFDS. In fact, the to/from notation must be used when defining subfields of the PSDS and INFDS in order to allow the compiler to validate the subfield definitions. The definition of subfields in the INFDS and PSDS must match the definitions specified in the VARPG Language Reference. A compile time error will be issued if they do not.

There cannot be an unconditional LEAVE or ITER operation as anything other than the last operation in a loop, otherwise the Java compiler issues an error. If there is an unconditional LEAVE or ITER operation in a loop, all operations occurring after it in the loop should be deleted because they will never be executed.

When adding and subtracting date/time/timestamp durations, only values between maxint (2 147 483 647) and −maxint (−2 147 483 648) can be used.

Because Java does not allow int (10I), short (5I), float (4F),and double (8F) values to be passed by reference, Java code has to be generated by VARPG to retain this functionality for subprocedures being converted to Java. The code generated to accomplish this can cause Java compiler errors when the VARPG source contains subprocedures with multiple return points and receives integer or float parameters passed by reference.

```
Sample code that may cause Java compile errors:
    C       IF          x = 1
    C       ...
    C       RETURN      1
    C       ELSE
    C       ...
    C       RETURN      0
    C       ENDIF
This code should be changed to:
    C       IF          x = 1
    C       ...
    C       RETURN      1
    C       ELSE
    C       ...
    C       ENDIF
    C       RETURN      0
```

More Restrictions and runtime behavior differences

The characters '*', '#', and '@' cannot be contained in Java identifiers. Because of this, all occurrences of '*' '#' and '@' in VARPG names will be changed to '_'. It is possible that this will result in duplicate names.

If a COMMIT or ROLBK operation is coded within an application that has no files, a severity 30 message (RNF7833) will be issued.

Because of the way that a local *PSSR is converted to Java, it is not possible to call a local *PSSR. Because GOTO is not supported, the only way to leave a local *PSSR and avoid the default handler is to code a RETURN operation.

There is no short circuiting of logical expressions so the order in which a compound logical expression is executed is not reliable.

Varying length fields are implemented as a class when converting to Java so they are not stored as documented in the VARPG Language Reference. Code that relies on a certain storage format way will not work.

Data structure subfields will not be initialized to blanks if there is no initial value provided, but will be initialized to a default value depending on the datatype of the subfield. The default value is 0 for numerics, blanks for character, and *LOVAL for date, time, and timestamp.

Varying length fields will have their length set to 0. If a length is specified for a data structure, it must match the total length of the subfields it contains, otherwise the compiler will issue a sev 30 diagnostic message.

Subroutines cannot be defined within subprocedures. The only exception is that a *PSSR can be defined within a subprocedure. Any subroutines within subprocedures should be moved outside the subprocedure. If the subroutine accesses local fields within the subprocedure, then either the fields need to be changed to global fields, or the subroutine should be changed to a subprocedure that accepts the local fields as parameters.

Unconditional LEAVE statements within DO loops are not supported. A Java compiler error will occur if this situation exists. Since an unconditional LEAVE within a DO loop means that the loop will only ever be executed once, the LEAVE should be removed and the code changed to remove the loop operation codes.

Using event attributes in fixed compound conditional statements currently causes Java compile errors. The equivalent freeform expression should be used instead and the code should be changed as follows:

```
Sample code that may cause Java compile errors:
    C       %mousex     IFEQ        x
    C       %mousey     ANDEQ       y
    C       ...
    C                   ENDIF
This code should be changed to:
    C                   IF          %mousex = x AND
    C                                           %mousey = y
    C       ...
    C                   ENDIF
```

An unconditional RETURN operation cannot be coded unless it is the last statement in a user subroutine, action subroutine, or subprocedure; otherwise, the Java compiler may report an error. SELECT statements can cause Java compile errors when they occur in subprocedures or contain RETURN operations and no RETURN is coded within the main body of the subprocedure. In general, a RETURN operation should be coded for all possible code paths of a subprocedure, otherwise the Java compiler may report errors.

| Sample code that may cause Java compile errors: | | | |
|---|---|---|---|
| C | | SELECT | |
| C | x | WHENEQ | y |
| C | | RETURN | 1 |
| C | x | WHENEQ | z |
| C | | RETURN | 2 |
| C | | OTHER | |
| C | | RETURN | 0 |
| C | | ENDSL | |

| This code should be changed to: | | | |
|---|---|---|---|
| C | | SELECT | |
| C | x | WHENEQ | y |
| C | | RETURN | 1 |
| C | x | WHENEQ | z |
| C | | RETURN | 2 |
| C | | ENDSL | |
| C | | RETURN | 0 |

Arrays cannot be passed by value to subprocedures.

Because of differences between the Windows and Java environments an application may run differently under Java than it does under Windows. The following areas are affected:

The %SCAN builtin function will return an integer result, in Windows, it returns an unsigned result; the truncate numeric build option is unreliable.

When an I/O exception occurs, the user will not be given the option to retry the operation.

Data structures are not treated as one large character field when the Java application is running which may cause unexpected results.

The format of binary, integer, and unsigned datatypes is handled differently for local files, e.g., when reading and writing local files the Java format of having the high order bytes being left most is assumed, whereas when running as a Windows application, they are right most.

Exception handling for subprocedures will behave the same as for action subroutines and the default error handler is called if there is no local *PSSR or INFSR and no error indicator or error operation code extender on the operation.

If an invalid date, time, or timestamp value is encountered when reading or writing a field to/from a file, the field will be set to the default value (*LOVAL) and no error is reported. Java can only handle a three digit millisecond portion in timestamps. When doing calculations with timestamps that use all six digits of the millisecond portion, i.e., they do not have milliseconds in the form 000xxx, the results might not be as expected.

Intermediate results in expressions are not limited to thirty digits. In fact, when running in the VARPG environment, no attention is paid to the precision of intermediate results.

Memory cannot be shared between components. If a component is started by another component via START, changes made to passed parameters are not reflected across components.

Integer overflow/underflow will not be reported. Float overflow/underflow will be reported as status 9999.

If an error occurs while a subprocedure in a NOMAIN or EXE application is being executed, and there is no error indicator or error operation code extender, or *PSSR, then the error will be reported back to the caller and handled by the caller. When running under Windows, the application would terminate.

Positioning a host file to Null-Valued Records when ALWNULL(*NO) has been specified results in CPF5035.

The following language elements are not supported when running a VARPG applet and will result in Java errors at run time: Printer files, Local files, Calling C functions, external subprocedures, EXEs. NOMAIN and EXE applications cannot be run as applets.

Although a specific embodiment of the invention has been described herein in some detail, this has been done solely for the purpose of illustrating the invention in various of its aspects, and it is to be understood that the foregoing description does not limit the scope of the invention. It is contemplated that various substitutions, alterations and/or modifications to the embodiment of the invention disclosed herein, including but not limited to those implementation options specifically noted herein, may be made to the invention without departing from the spirit and scope of the invention as defined in the appended claims.

The embodiments of the invention in which an exclusive property or privilege is claimed are defined as follows:

1. A computer-implemented method for generating source code in an object-oriented language from a report generator language source code, said method comprising the steps of:
    (a) naming a class for the source code in the object-oriented language;
    (b) generating internal instance variables used in emulating behaviour of said report generator language source code for the object-oriented language;
    (c) converting global fields of the report generator language source code to instance variables;
    (d) converting specifications for input/output formats of the report generator language source code to object-oriented methods for reading and writing records;
    (e) converting a calculation specification to object-oriented methods;
    (f) generating a constructor that creates and initializes the global fields; and
    (g) generating object-oriented methods for error detection and correction wherein the behaviour of said report generator language source code is preserved in said object-oriented language.

2. The computer implemented method of claim 1, further comprising the steps of:
    (a) generating a main method in the object-oriented language.

3. The computer implemented method recited in claim 2, wherein the report generator language source code is an EXE project.

4. The computer implemented method of claim 1, further comprising the steps of:
    (a) generating methods to interface with a GUI.

5. The computer implemented method recited in claim 4, wherein the report generator language source code is a VISUAL project.

6. The computer-implemented method recited in claim 1, wherein the report generator language source code is a NOMAIN project.

7. The computer implemented method recited in claim 1, wherein the object-oriented language is Java.

8. The computer implemented method recited in claim 1, wherein said step of converting specifications for input/output formats of the report generator language to object-oriented methods comprises reading, writing, clearing and resetting records and windows.

9. A computer-implemented method of calling Java methods from a report program language, comprising the steps of:
(a) adding an Object datatype to the report program language, said Object datatype representing fields that can store Java object references;
(b) adding a CLASS keyword to the report program language, said CLASS keyword specifying a class of said Object datatype;
(c) adding an extension of an EXTPROC keyword to the report program language; and
(d) calling the report program language statements wherein said Object datatype indicates that a Java object reference is being called having a class keyword, CLASS; and said extension of said EXTPROC specifies a name of a Java method and class to which said Java method belongs.

10. A computer-implemented method converting an RPG project to Java source code comprising the steps of:
(a) naming a class for the source code in Java;
(b) generating internal instance variables used in emulating RPG behaviour in Java;
(c) converting global fields of the RPG project to Java instance variables;
(d) converting specifications for input/output formats of the RPG project to Java methods for reading, writing, clearing, and resetting records and windows;
(e) converting a calculation specification to Java methods;
(f) generating a constructor that creates and initializes the global fields; and
(g) generating Java methods for error detection and correction wherein behaviour of said RPG project is preserved in said Java source code.

11. The method of claim 10, further comprising the step of:
(a) generating a main method in Java wherein said RPG project is a VISUAL or an EXE project.

12. The method of claim 10, further comprising the step of:
(a) generating a Java method to interface with a GUI.

13. A computer system for converting a procedural language source code to computer source code in an object-oriented language, comprising:
(a) a central processing unit;
(b) a main memory connected to the central processing unit with a communication bus network;
(c) a data storage unit connected to a data storage interface which is connected to said communication bus network;
(d) at least one input/output device connected to an interface which is connected to said communication bus network, said input/output device to provide input to said central processing unit;
(e) a procedural language compiler connected to said main memory and said central processing unit; said procedural language compiler further comprising:
(i) a class namer to name a class for the object-orient source code;
(ii) an internal instance variable generator;
(iii) a global fields converter to convert global fields of the procedural language to instance variables;
(iv) an I/O specification converter for converting input/output formats of the procedural language source code to object-oriented methods for reading, writing, clearing and resetting windows and records;
(v) a calculation specification converter to convert any calculations in the procedural language source code to object-oriented methods;
(vi) a constructor generator to generate an object-oriented constructor that creates and initializes the global fields; and
(vii) an error detector and handler;
(f) an object-oriented computer language compiler connected to said procedural language compiler to compile said object-oriented source code and preserve behaviour of said procedural language source code to control said central processing unit.

14. A program product for use in a computer system for generating object-oriented source code from a report generator language source code, said program product comprising a signal-bearing medium carrying thereon:
(a) a class namer to name a class for the object-orient source code;
(b) an instance variable generator to generate internal instance variables for an object-oriented compiler;
(c) a global fields converter to convert global fields of the report generator language source code to instance variables;
(d) an I/O specification converter for converting input/output formats of the report generator language source code to object-oriented methods for reading, writing, clearing and resetting windows and records;
(e) a calculation specification converter to convert any calculations in the report generator language source code to object-oriented methods;
(f) a constructor generator to generate a constructor to create and initialize global fields; and
(g) an error detector and handler,
whereby behaviour of said report generator language source code is preserved in said object-oriented source code.

* * * * *